United States Patent
Zhang et al.

(10) Patent No.: US 12,526,307 B2
(45) Date of Patent: Jan. 13, 2026

(54) INLINE VULNERABILITY DETECTION FOR PROGRAM CODE GENERATED BY A LANGUAGE MODEL

(71) Applicant: Palo Alto Networks, Inc., Santa Clara, CA (US)

(72) Inventors: Haozhe Zhang, San Jose, CA (US); Qi Deng, Sunnyvale, CA (US); Chien-Hua Lu, San Jose, CA (US); Shengming Xu, San Jose, CA (US); Bo Qu, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 33 days.

(21) Appl. No.: 18/758,985

(22) Filed: Jun. 28, 2024

(65) Prior Publication Data
US 2026/0006056 A1    Jan. 1, 2026

(51) Int. Cl.
*H04L 9/40* (2022.01)

(52) U.S. Cl.
CPC .................. *H04L 63/1433* (2013.01)

(58) Field of Classification Search
None
See application file for complete search history.

(56) References Cited

U.S. PATENT DOCUMENTS 12,323,449 B1 * 6/2025 Graves .................. G06F 9/545

OTHER PUBLICATIONS

Gupta, et al., "From ChatGPT to ThreatGPT: Impact of Generative AI in Cybersecurity and Privacy", IEEE Access, Aug. 2023, 28 pages, DOI:10.1109/ACCESS.2023.3300381.

* cited by examiner

*Primary Examiner* — Cai Y Chen
(74) *Attorney, Agent, or Firm* — Gilliam IP PLLC (57) ABSTRACT

Vulnerable program code generated by a language model is detected inline. A detection service monitors for and intercepts network traffic of a language model. For responses from the language model that include generated program code, the detection service extracts the program code and determines a programming language to which the program code corresponds. The detection service employs machine learning-based and/or rule-based vulnerability detection techniques to determine whether the program code comprises any vulnerabilities. If the program code is determined to comprise a vulnerability, the detection service can block transmission of the response comprising the program code to its destination or communicate an alert with the response indicating that the program code is vulnerable to prevent inclusion of the vulnerable program code in a software project.

20 Claims, 5 Drawing Sheets

INLINE VULNERABILITY DETECTION FOR PROGRAM CODE GENERATED BY A LANGUAGE MODEL

BACKGROUND

The disclosure generally relates to data processing (e.g., CPC subclass G06F) and to security arrangements for protecting computers, components thereof, programs or data against unauthorized activity (e.g., CPC subclass G06F 21/00).

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLaMA. Foundation models are based on artificial neural networks including generative adversarial networks (GANs), transformers, and variational encoders. For instance, some large language models (LLMs) are based on transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This description refers to inline detection of vulnerable program code. The term "inline" is a contrast with "out-of-band." In networking, inline used as a modifier for processing of network traffic refers to processing network traffic in the communication path that the network traffic is traversing. If traffic is being processed out-of-band, the traffic or copies thereof are being sent to a remote location for processing (i.e., outside of the network device).

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

The use of language models such as LLMs for various tasks has become increasingly widespread. One such application of language models is for program code generation, where a language model can be prompted to generate program code of a particular programming language. However, language models may not be reliable for generating secure program code. Generated program code may thus include vulnerabilities, which can be problematic if the language model-generated program code is incorporated in a software project.

To address this, inline detection of vulnerable program code generated by a language model can be performed as described herein. A detection service monitors for and intercepts network traffic of a language model. For responses from the language model that include generated program code, the detection service extracts (e.g., copies) the program code and determines a programming language to which the program code corresponds. The detection service can then employ machine learning-based and/or rule-based vulnerability detection techniques to determine whether the program code comprises any vulnerabilities. With machine learning-based detection, the detection service runs a trained model that detects vulnerabilities in program code (e.g., a pretrained transformer-based model) on the program code and determines whether the program code comprises a vulnerability based on an output of the model. Rule- and pattern-based approaches for vulnerability detection include pattern-based detection (e.g., with regular expressions) and/or detection based on abstract syntax trees (ASTs) generated from program code. For the former, the detection service determines if any patterns defined for vulnerabilities match the program code. To detect vulnerabilities from ASTs, the detection service generates an AST from the program code and evaluates the AST based on rules for vulnerability detection defined for ASTs, such as based on evaluating values of certain AST nodes. If the program code is determined to comprise a vulnerability, the detection service can block transmission of the response comprising the program code to its destination or communicate an alert with the response indicating that the program code is vulnerable to prevent inclusion of the vulnerable program code in a software project.

Example Illustrations

Figure 1:
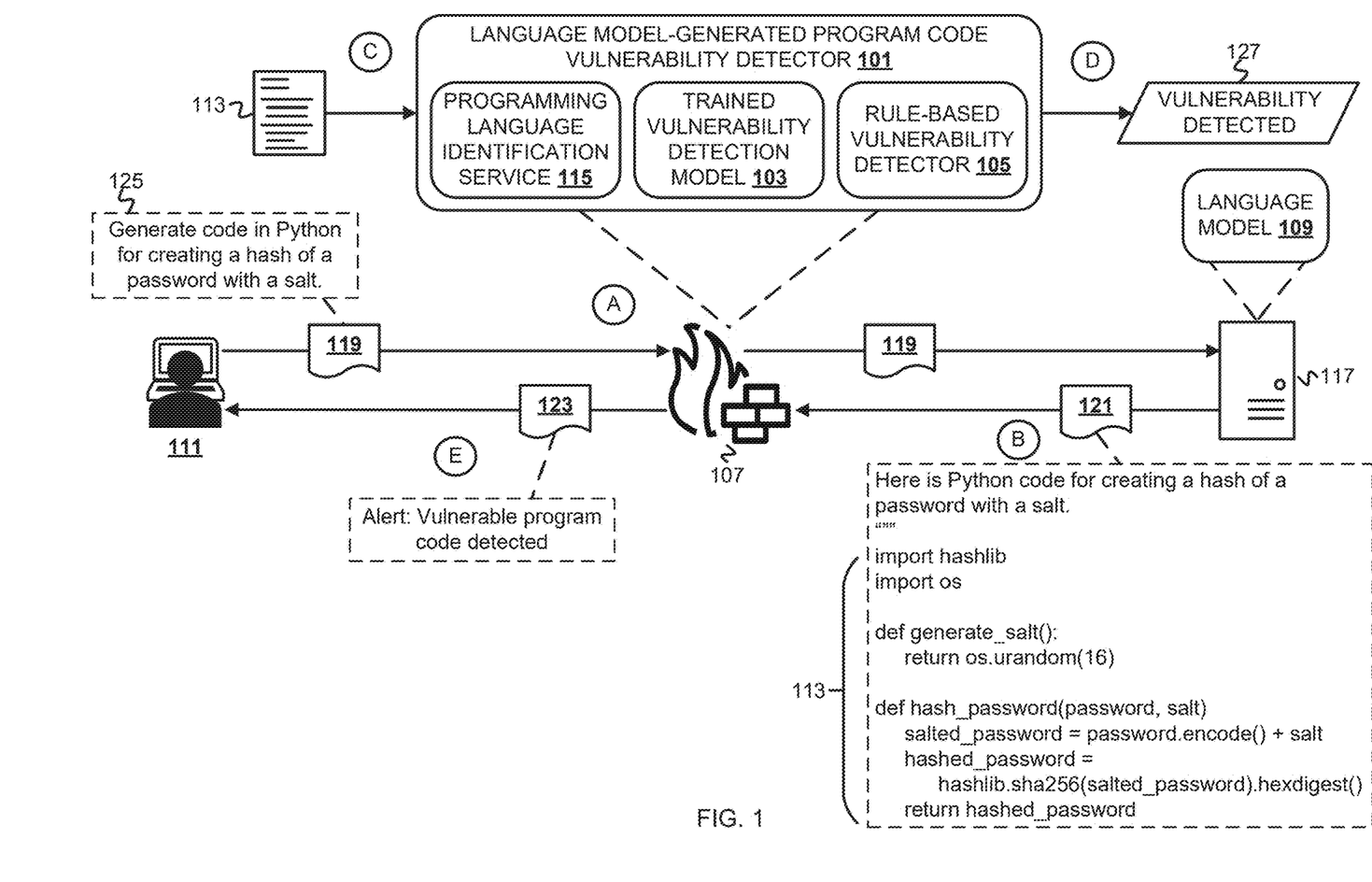
FIG. 1 is a conceptual diagram of inline detection of vulnerable program code generated by a language model.

FIG. 1 is a conceptual diagram of inline detection of vulnerable program code generated by a language model. A language model-generated program code vulnerability detector ("the vulnerability detector") 101 executes on a firewall 107 (e.g., as a firewall service). The firewall 107 classifies network traffic sessions by associated application (e.g., with application identification technology). The vulnerability detector 101 monitors for network traffic classified by the firewall 107 as corresponding to a language model. For instance, the vulnerability detector 101 can be configured with one or more application names, traffic classes, etc. into which the firewall 107 classifies network traffic that are known to correspond to language models. This example depicts a language model 109 that executes on a server 117 and is assumed to have a defined traffic class into which the firewall 107 classifies network traffic. The language model 109 can be a pre-trained LLM accessible via the Internet, for example.

FIG. 1 is annotated with a series of letters A-E. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the firewall 107 intercepts a request 119 from a client 111 and forwards the request 119 to the server 117. The request 119 is a request issued by the client 111 for the language model 109 to generate program code. In particular, the request 119 comprises a prompt 125 for generating code in the Python® programming language for creating a hash of a password with a salt. The firewall 107 classifies network traffic associated with this session into a class corresponding to the language model 109 (e.g., based on application identification performed during session setup). The firewall 107 forwards the request 119 to the destination associated with the session, which is the server 117 that hosts the language model 109.

At stage B, the firewall 107 detects a response 121 from the server 117 comprising program code 113 generated by the language model 109. The vulnerability detector 101 determines that the response 121 comprises program code 113 based on identifying characters or tags included in the response 121. For instance, some language models may use a string of characters such as quotation marks (") to indicate program code. In other examples, responses can include tags that identify program code, such as "<code>" tags. The vulnerability detector 101 extracts (e.g., copies) the program code 113 between the identifying characters, tags, etc. so that any descriptive text generated by the language model 109 is excluded. This example depicts the response 121 as including triple quotation marks (" ") that guide the vulnerability detector 101 in extracting the program code 113 from the response 121. This example depicts the program code 113 as comprising a fixed salt value that is passed to the function from which a hashed password is generated.

At stage C, the vulnerability detector 101 analyzes the program code 113 to determine if it comprises a vulnerability. Since analysis of the program code 113 for vulnerabilities is based on a programming language of the program code, the vulnerability detector 101 first determines a language of the program code 113. A programming language identification service 115 of the vulnerability detector 101 determines the programming language of the program code 113 based on one or more rules, logical expressions, etc. For instance, the programming language identification service 115 can be configured with one or more patterns (e.g., regular expressions) and/or logical expressions for each of a plurality of programming languages, and the programming language of the program code 113 is determined based on matching of pattern, satisfaction of a logical expression, etc. The programming language identification service 115 in this example determines that the program code 113 is written in Python. Based on determining the programming language of the program code 113, the vulnerability detector 101 analyzes the program code 113 based on a combination of machine learning techniques and rule-based techniques.

The vulnerability detector 101 utilizes a trained vulnerability detection model ("trained model") 103 that predicts whether program code comprises a vulnerability. The trained model 103 may be a pre-trained off-the-shelf or open-source model that accepts program code as inputs. Such pre-trained models are available for a variety of programming languages and generally are trained to detect vulnerabilities for one respective programming language, though models may be trained for vulnerability detection for multiple programming languages. In other examples, a cybersecurity provider that provides the vulnerability detector 101 may have trained a model (e.g., a transformer-based model) on Python program code samples known to have vulnerabilities and known to be secure. In the latter case, the vulnerability detector 101 may perform any preprocessing of the program code to generate inputs compatible with the trained model 103.

The vulnerability detector 101 also comprises a rule-based vulnerability detector 105 that analyzes program code based on defined rules for vulnerability detection. Rule-based analysis of program code includes pattern-based analysis based on patterns defined for known vulnerabilities and/or AST-based analysis based on rules for vulnerability detection using ASTs. For pattern-based analysis, the rule-based vulnerability detector 105 maintains a plurality of patterns such as regular expressions defined for known vulnerabilities for supported programming languages and determines if the program code 113 matches any of the patterns. To illustrate, the rule-based vulnerability detector 105 can comprise a rule indicating a regular expression for detecting a constant salt value that is used as part of hashing a password and a condition that a vulnerability should be detected if the regular expression is matched by program code. Because the program code 113 comprises a constant salt value that is used for password hashing, the rule-based vulnerability detector 105 would match this regular expression to the program code 113, and the rule for detecting the associated vulnerability is thus satisfied.

For AST-based analysis, the rule-based vulnerability detector 105 generates an AST of the program code 113 and evaluates the program code 113 based on rules defined for identifying vulnerabilities from ASTs of program code. These rules can indicate checks for values of certain nodes of an AST, such as nodes corresponding to certain function arguments. For example, the rule-based vulnerability detector 105 can comprise a rule for detecting a fixed salt value used for password hashing based on a value of a corresponding node of an AST. As an illustrative example, the rule-based vulnerability detector 105 can be configured with the following rule for detecting constant salt values used for password hashing based on an AST generated from program code:

if Call.Func.name=="pbkdf2_hmac" and isConstant(Call.Args[2]): return
 "VulnerableCode: Constant salt for hash detected"

Because the program code 113 comprises such a constant salt value for a password hash, the rule-based vulnerability detector 105 also would find this AST-based rule to be satisfied by the program code 113.

At stage D, the vulnerability detector 101 determines, based on results of analyzing the program code 113, that the program code 113 comprises a vulnerability. Vulnerability detection can be based on one of the detection techniques resulting in a verdict that the program code 113 comprises a vulnerability, based on a majority of the detection techniques resulting in a vulnerability detection verdict, or based on all detection techniques resulting in a vulnerability detection verdict. These conditions for providing a vulnerability verdict may be configurable by end users depending on whether a conservative or aggressive approach for vulnerability detection is desired. This example assumes that the program code 113 comprises a vulnerability, so the vulnerability detector 101 generates a verdict 127 indicative of the detected vulnerability.

At stage E, the firewall 107 sends a response 123 to the client 111 indicating that vulnerable program code was detected in the program code 113 generated by the language model 109. Because the verdict 127 generated by the vulnerability detector 101 indicates that the response 121 comprises vulnerable program code, the firewall 107 can prevent transmission of the program code 113 to the client 111 or can send a response to the client 111 comprising the program code 113 with an alert that the program code is vulnerable. Whether vulnerable program code is blocked or sent to clients with an alert can be a configurable feature of the vulnerability detector 101.

FIGS. 2-5 are flowcharts of example operations. The example operations are described with reference to a language model-generated program code vulnerability detector (hereinafter simply the "vulnerability detector") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 2:
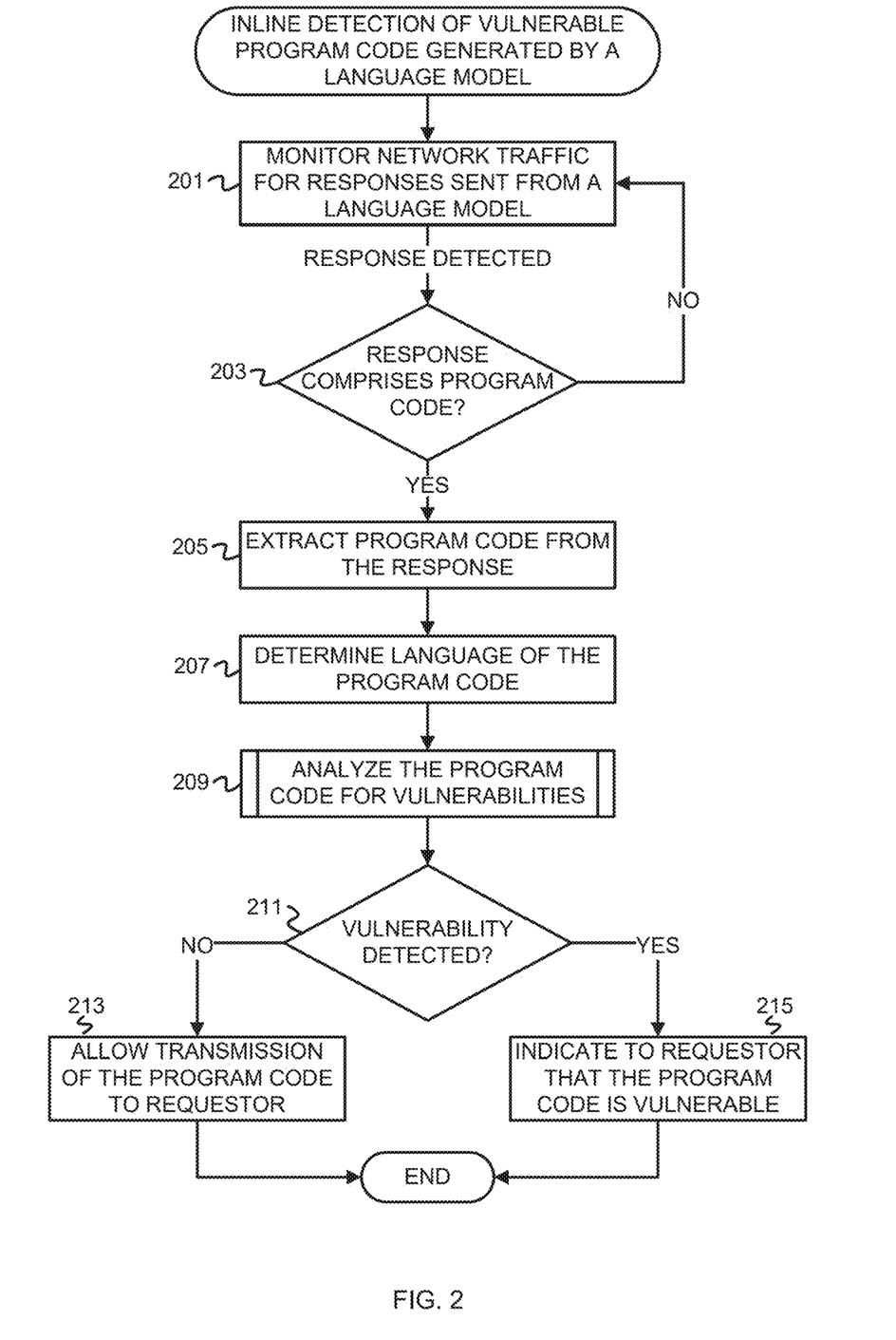
FIG. 2 is a flowchart of example operations for inline detection of vulnerable program code generated by a language model.

FIG. 2 is a flowchart of example operations for inline detection of vulnerable program code generated by a language model. The vulnerability detector executes on a cybersecurity appliance (e.g., a firewall) or a proxy that intercepts network traffic sent between a source and a destination. The cybersecurity appliance or proxy should be configured with application identification or traffic classification capabilities. Application identification/traffic classification can be per session such that each session tracked by the cybersecurity appliance or proxy is associated with an application identifier, traffic class, etc.

At block 201, the vulnerability detector monitors network traffic for responses sent from a language model. The vulnerability detector monitors for responses sent during sessions associated with one or more language models. These sessions are identified as being associated with a respective language model based on the application identifier, traffic class, etc. associated with the session. The language model application may have been identified based on a signature, pattern, and/or protocol corresponding to the language model. The vulnerability detector has thus been configured with one or more application identifiers, traffic classes, etc. that have been defined for one or more language models. Operations continue to block 203 when such a response is detected, and the monitoring continues while network traffic is transmitted.

At block 203, the vulnerability detector determines if the response comprises program code. The response can comprise program code if, for instance, a client associated with the session prompted the language model to generate program code to accomplish some task. Language models generally denote program code using a string(s), tags, or a similar indicator of the start and/or end of program code. Examples include triple quotes and HyperText Markup Language (HTML) "<code></code>" tags. The vulnerability detector determines if any of these indications of program code are present in the response based on the contents of the response (e.g., the response body). If the response comprises program code, operations continue at block 205. If the response does not include program code, the vulnerability detector allows transmission of the response to the requestor (assuming it is not blocked by the cybersecurity appliance or proxy), and operations continue to block 201 where the vulnerability detector continues to monitor for network traffic associated with a language model.

At block 205, the vulnerability detector extracts the program code from the response. The vulnerability detector extracts the program code based on the indicators of program code described at block 203 so that any descriptive text (i.e., text that does not correspond to program code) is omitted from subsequent evaluation. For instance, if HTML code tags are used to indicate the program code in the response, the vulnerability detector extracts the program code identified between the code tags.

At block 207, the vulnerability detector determines a language of the program code. The vulnerability detector determines the language of the program code based on matching the program code to one or more patterns (e.g., regular expressions) and/or evaluating the program code based on one or more logical expressions. Patterns and/or logical expressions can be defined to check for keywords or combinations of keywords that are known to be associated with a particular programming language, for instance. Patterns and/or logical expressions can also be defined for matching the syntax and/or structure of declaration and/or definition of particular units of program code of a certain language, such as declaration/definition of variables and functions/methods.

At block 209, the vulnerability detector analyzes the program code for vulnerabilities. The vulnerability detector uses a multitude of vulnerability analysis techniques to detect any vulnerabilities in the program code. Vulnerability analysis techniques include machine learning- and rule-based techniques. For instance, the vulnerability detector can provide the program code as input to a machine learning model that has been trained to detect vulnerabilities in program code, where the program code may be preprocessed before being input to the model based on expected format of inputs to the model. Rule-based techniques include pattern-based analysis and AST-based analysis based on respective patterns and AST rules defined for known vulnerabilities. Analysis of program code for vulnerabilities is described in further detail in reference to FIG. 3.

At block 211, the vulnerability detector determines if a vulnerability was detected for the program code. Whether a vulnerability was detected is based on results of the vulnerability analysis performed at block 209. If a vulnerability was not detected, operations continue at block 213. If a vulnerability was detected, operations continue at block 215.

At block 213, the vulnerability detector allows transmission of the program code to a requestor. The requestor is a source entity associated with the session to which the response is destined.

At block 215, the vulnerability detector indicates to the requestor that the program code is vulnerable. The requestor is a source entity associated with the session to which the response is destined. The vulnerability detector can prevent transmission of the program code to the requestor by transmitting an alert indicating that the generated program code is vulnerable to the requestor, for instance. As another example, the vulnerability detector can allow transmission of the response to the requestor but will generate an alert indicating that the program code is vulnerable and include this alert with the transmitted request. The indication that the program code is vulnerable may also include an indication of the vulnerability(ies) identified as a result of the analysis of the program code.

FIG. 2 depicts the example operations as being complete after blocks 213 and 215, though in implementations, the monitoring continues while network traffic is transmitted.

The example operations can thus be ongoing as the vulnerability detector identifies responses that comprise program code in network traffic corresponding to a language model.

Figure 3:
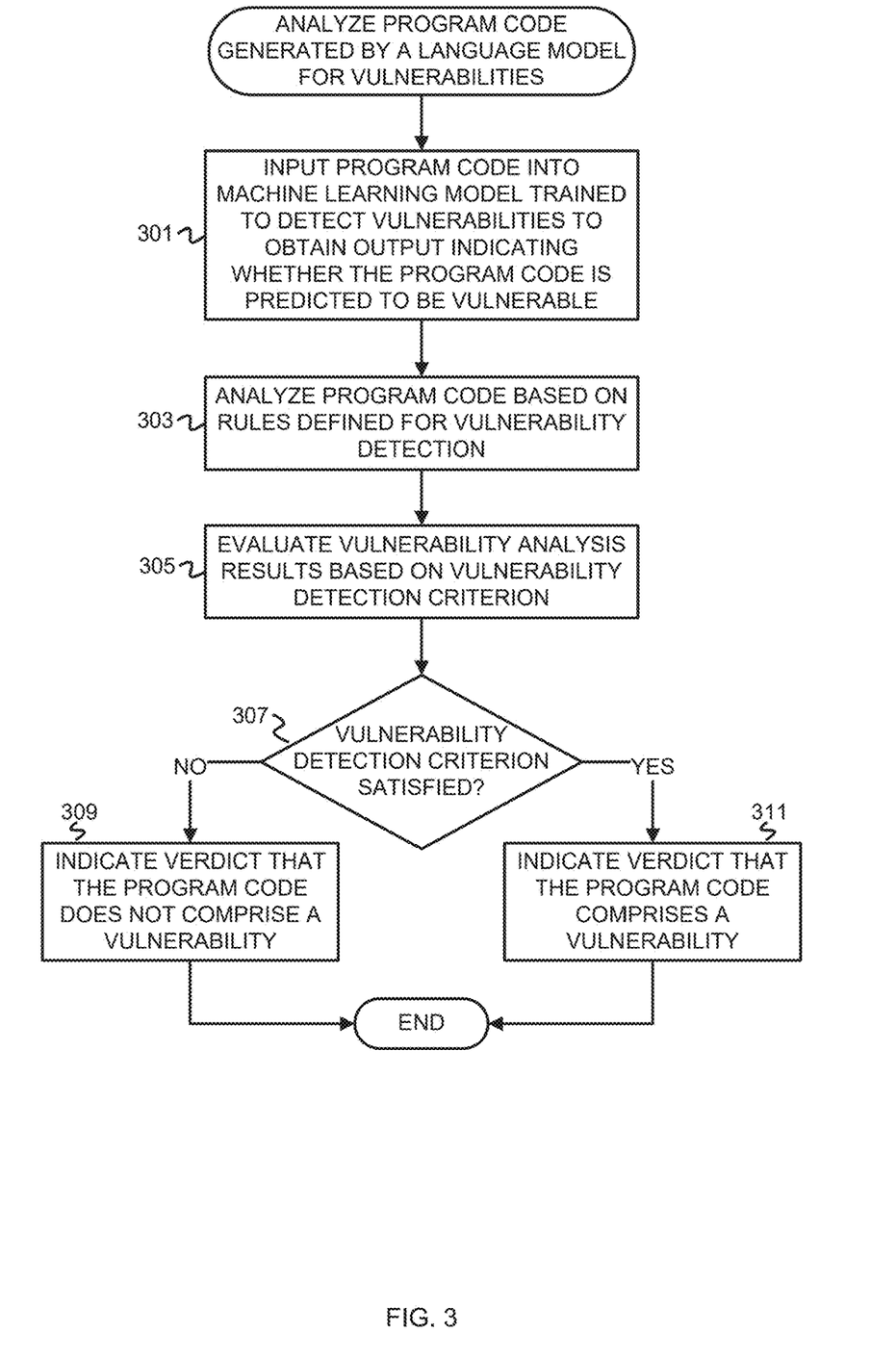
FIG. 3 is a flowchart of example operations for analyzing program code generated by a language model for vulnerabilities.

FIG. 3 is a flowchart of example operations for analyzing program code generated by a language model for vulnerabilities. The example operations are performed when program code generated by a language model has been identified and extracted from detected network traffic.

At block 301, the vulnerability detector inputs the program code into a machine learning model that has been trained to detect vulnerabilities to obtain an output indicating whether the program code is predicted to be vulnerable. The vulnerability detector provides the program code (or a preprocessed version thereof, depending on expected input format of the trained model) as input to the trained model. The machine learning model can be a pre-trained off-the-shelf model, a pre-trained open-source model, or similar. Models that can be trained for vulnerability detection include Bidirectional Encoder Representations from Transformers (BERT) models or BERT-based models. The model has been trained on program code samples with and without vulnerabilities. The model may be programming language-specific in that the model was trained to predict the presence of vulnerabilities in program code of the associated programming language. The vulnerability detector thus can have access to a plurality of models trained for vulnerability detection that correspond to a plurality of programming languages supported by the vulnerability detector. An output of the trained model indicates whether the program code is predicted to comprise a vulnerability.

At block 303, the vulnerability detector analyzes the program code based on rules defined for vulnerability detection. Rules defined for vulnerability detection can include rules for pattern matching, such as regular expressions, where each pattern/regular expression is defined for a known vulnerability. Rules defined for vulnerability detection can also comprise rules for ASTs generated from program code. For instance, each rule can comprise a check for a value(s) of a node of an AST, such as a node corresponding to a parameter of a function. In this case, the vulnerability detector generates an AST from the program code and evaluates the AST based on the rules defined for vulnerability detection from ASTs.

At block 305, the vulnerability detector evaluates the results of vulnerability analysis based on a vulnerability detection criterion. Since the vulnerability detector analyzes program code for vulnerabilities with multiple techniques, the criterion can designate how many analyses should result in a vulnerability verdict for a vulnerability to be reported as detected. For instance, the vulnerability detection criterion can be a criterion that a vulnerability is to be reported as detected if any of the analyses resulted in identification of a vulnerability. To illustrate, the criterion can indicate that a vulnerability should be detected if any one of the machine learning-based or rule-based analyses yielded a finding that a vulnerability is present. In other examples, the criterion can indicate that a vulnerability should be reported as detected if a majority of the analyses (e.g., a majority among the machine learning-based and rule-based analyses) yielded a finding that a vulnerability is present. The criterion can be configurable by an end user to accommodate vulnerability detection preferences.

At block 307, the vulnerability detector determines if the vulnerability detection criterion is satisfied. If the vulnerability detection criterion is not satisfied, operations continue at block 309. If the vulnerability detection criterion is satisfied, operations continue at block 311.

At block 309, the vulnerability detector indicates a verdict that the program code does not comprise a vulnerability. Indicating that the program code does not comprise a vulnerability can be implicit or explicit (e.g., by setting a flag, generating a notification, etc.).

At block 311, the vulnerability detector indicates a verdict that the program code comprises a vulnerability. The vulnerability detector can set a flag, generate a notification, etc. indicating that the program code comprises a vulnerability. The vulnerability detector may also identify the vulnerability that was detected in the verdict.

FIG. 3 describes analyzing program code for vulnerabilities based on rule-based and machine learning-based techniques. In implementations, additional techniques can be utilized, such as heuristic techniques for vulnerability analysis or other techniques for rule-based vulnerability detection in addition.

Figure 4:
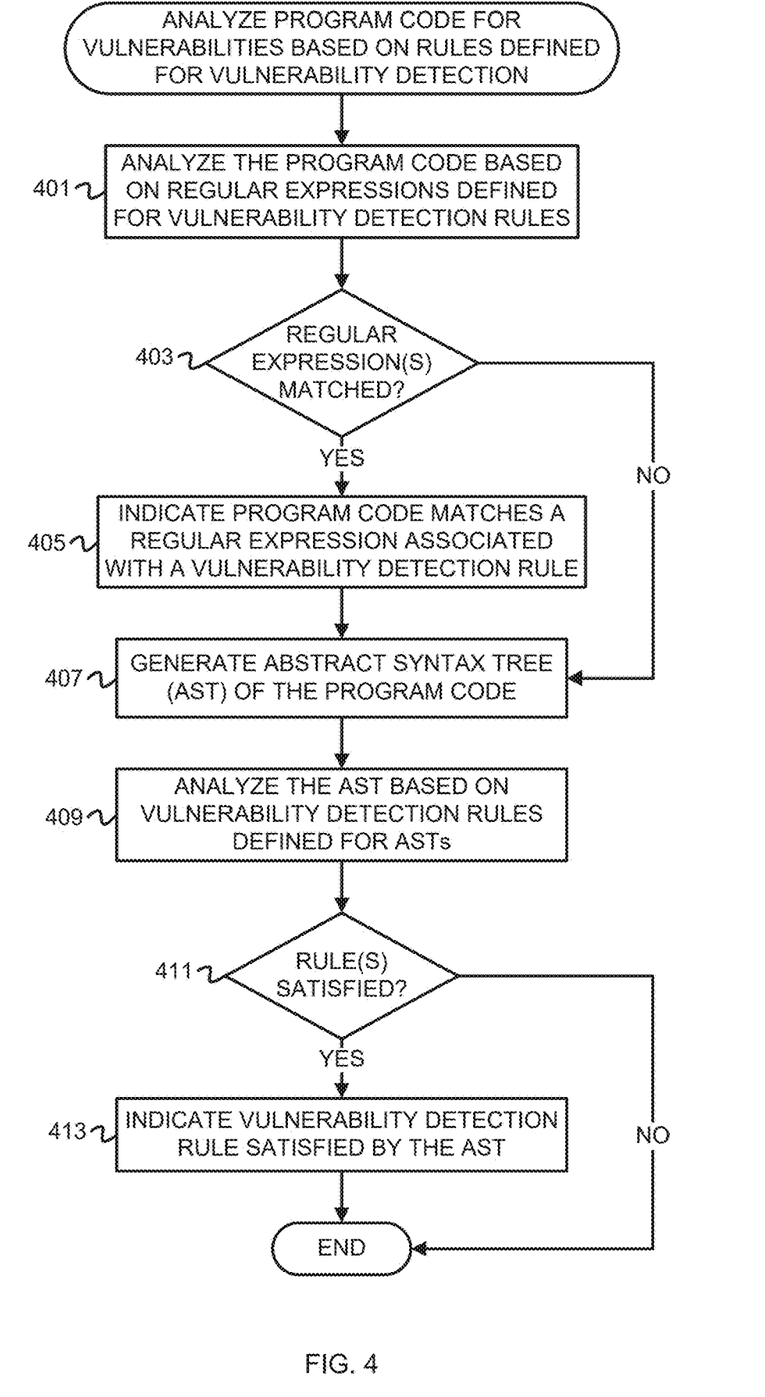
FIG. 4 is a flowchart of example operations for analyzing program code for vulnerabilities based on rules defined for vulnerability detection.

FIG. 4 is a flowchart of example operations for analyzing program code for vulnerabilities based on rules defined for vulnerability detection. As described in reference to FIG. 3, a variety of rule-based analyses can be performed to determine whether program code comprises a vulnerability. The example operations of FIG. 4 describe some possible rule-based analyses in greater detail. The example operations can implement block 303 of FIG. 3, for example.

At block 401, the vulnerability detector analyzes the program code based on regular expressions defined for vulnerability detection rules. Implementations can use regular expressions for the pattern-based vulnerability detection described above, where the vulnerability detector has been configured with vulnerability detection rules that indicate corresponding regular expressions. Each of the regular expressions is a pattern of a known vulnerability. Regular expressions are generally language-specific such that the regular expressions leveraged for analysis are determined based on the language of the program code that was identified as described above.

At block 403, the vulnerability detector determines if any of the regular expressions matched to the program code. If a regular expression(s) matched to the program code, operations continue at block 405. Otherwise, if no regular expressions matched, operations continue at block 407.

At block 405, the vulnerability detector indicates that the program code matches a regular expression associated with a vulnerability detection rule. This vulnerability detection rule is thus satisfied. The vulnerability detector can generate a notification or alert, set a flag, etc. to indicate that a vulnerability detection rule comprising a regular expression was satisfied by the program code matching the regular expression.

At block 407, the vulnerability detector generates an AST of the program code. The vulnerability detector can utilize a library for AST generation, for example.

At block 409, the vulnerability detector analyzes the AST based on vulnerability detection rules defined for ASTs. The vulnerability detector determines if the AST satisfies any rules defined for vulnerabilities identifiable in ASTs. AST-based rules can indicate checks to perform for values of certain nodes of an AST, such as those corresponding to function parameters, for instance.

At block 411, the vulnerability detector determines if any of the vulnerability detection rules for ASTs are satisfied by the AST. If a rule(s) is satisfied, operations continue at block 413. If no rules are satisfied, operations are complete.

At block 413, the vulnerability detector indicates that a vulnerability detection rule is satisfied by the AST. The vulnerability detector can generate a notification or alert, set a flag, etc. to indicate that a vulnerability detection rule was satisfied by the AST of the program code.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with reference to FIG. 2, the operations depicted in blocks 203-215 can be performed in parallel or concurrently across sessions as responses are detected at block 201. As another example, with reference to FIG. 4, the operations depicted at blocks 401-405 and at blocks 407-413 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
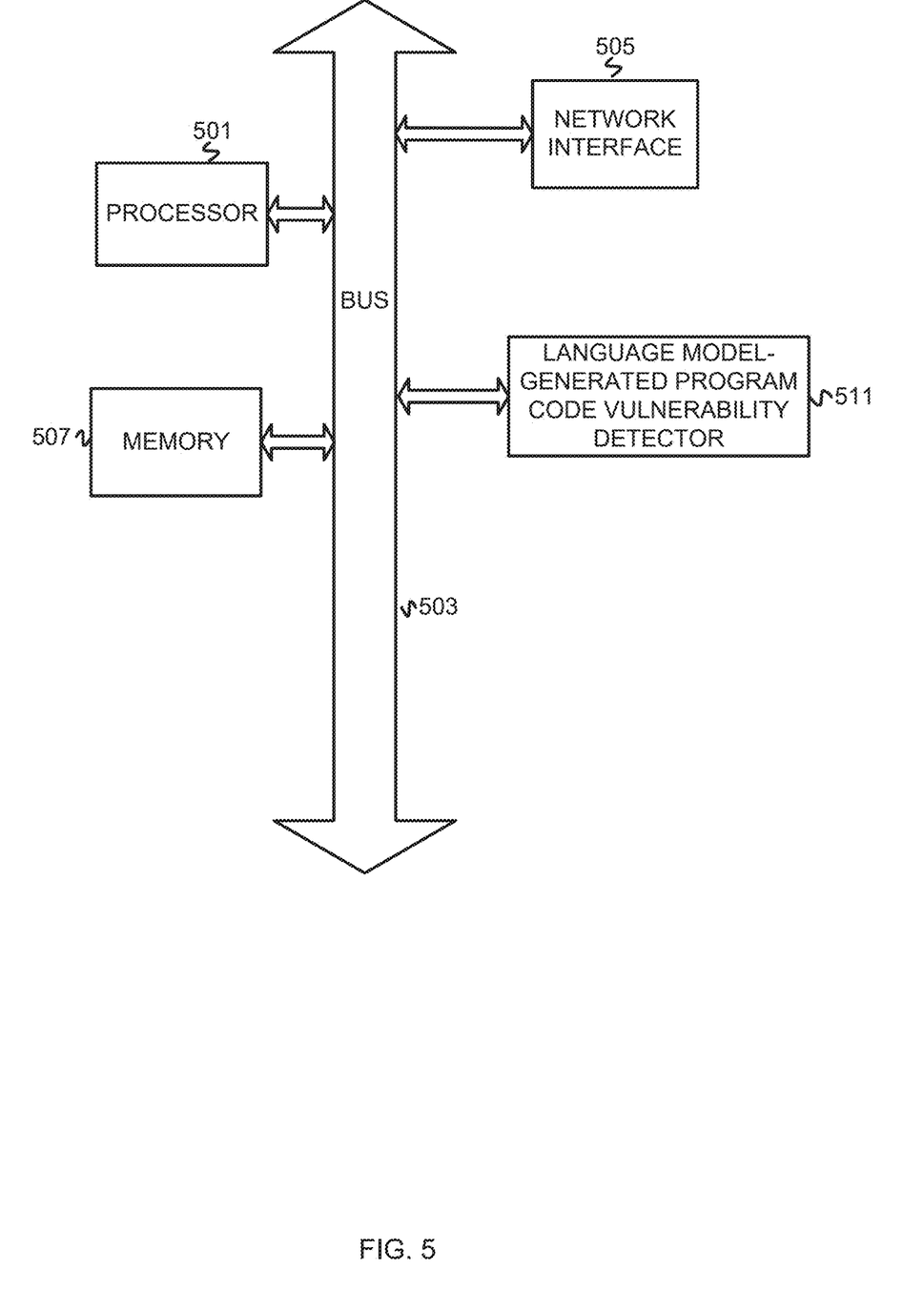
FIG. 5 depicts an example computer system with a language model-generated program code vulnerability detector.

FIG. 5 depicts an example computer system with a language model-generated program code vulnerability detector. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes language model-generated program code vulnerability detector ("the vulnerability detector") 511. The vulnerability detector 511 monitors for network traffic from a language model and, for identified responses that comprise program code generated by the language model, extracts the program code from the response and analyzes the program code for vulnerabilities. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:
    monitoring network traffic for responses from a language model;
    based on detection of a response from the language model, determining that the response comprises program code generated by the language model;
    determining a programming language to which the program code corresponds;
    analyzing the program code for vulnerabilities, wherein analysis of the program code for vulnerabilities is based on the programming language of the program code; and
    based on determining that the program code generated by the language model comprises a vulnerability, indicating that the program code comprises the vulnerability.

2. The method of claim 1, wherein indicating that the program code comprises the vulnerability comprises blocking transmission of the program code to its destination.

3. The method of claim 1, wherein analyzing the program code for vulnerabilities comprises at least one of running a machine learning model that has been trained to detect vulnerabilities in program code, analyzing the program code based on one or more patterns, and generating an abstract syntax tree (AST) from the program code and analyzing the AST based on one or more rules.

4. The method of claim 3, wherein the machine learning model is at least one of a pre-trained model and a model implemented with an open-source library, and wherein the machine learning model has been trained to detect vulnerabilities in program code corresponding to the determined programming language.

5. The method of claim 3, wherein determining that the program code generated by the language model comprises a vulnerability comprises determining that an output of the machine learning model indicates that the program code is vulnerable.

6. The method of claim 3, wherein analyzing the program code based on one or more patterns comprises analyzing the program code based on one or more regular expressions, wherein determining that the program code comprises a vulnerability comprises determining that the program code matches to a first of the one or more regular expressions.

7. The method of claim 3, wherein determining that the program code generated by the language model comprises a vulnerability comprises determining that the AST generated from the program code satisfies a first of the one or more rules.

8. The method of claim 1, wherein determining that the response comprises program code generated by the language model comprises determining that the response comprises one or more strings or one or more tags that are indicative of program code.

9. The method of claim 8, further comprising extracting the program code from the response based on identifying the one or more strings or the one or more tags.

10. The method of claim 1, wherein determining the programming language to which the program code corresponds comprises matching the program code to a first pattern of a plurality of patterns, wherein the first pattern corresponds to the programming language.

11. One or more non-transitory machine-readable media having program code stored thereon, the program code comprising instructions to:
    monitor network traffic for responses from one or more language models;
    based on detection of a response from a first language model, determine whether the response comprises code generated by the first language model;
    determine a programming language to which the code corresponds based on a determination that the response comprises code generated by the first language model;
    determine whether the code comprises vulnerabilities, wherein the instructions to determine whether the code comprises vulnerabilities comprise instructions to analyze the code for vulnerabilities based on the programming language of the code; and
    based on a determination that the code generated by the first language model comprises a vulnerability, indicate that the code comprises the vulnerability.

12. The non-transitory machine-readable media of claim 11, wherein the instructions to determine whether the code comprises vulnerabilities comprise at least one of instructions to run a machine learning model that has been trained to detect vulnerabilities in code, analyze the code based on one or more regular expressions, and generate an abstract syntax tree (AST) from the code and analyzing the AST based on one or more rules.

13. The non-transitory machine-readable media of claim 11, wherein the program code further comprises instructions to extract the code from the response based on identification of one or more strings or one or more tags indicative of code based on a determination that the response comprises code.

14. The non-transitory machine-readable media of claim 11, wherein the instructions to determine the programming language to which the code corresponds comprise instructions to match the program code to a first pattern of a plurality of patterns, wherein the first pattern corresponds to the programming language.

15. An apparatus comprising:
    a processor; and
    a machine-readable medium having instructions stored thereon that are executable by the processor to cause the apparatus to,
        monitor network traffic for responses from a language model;
        based on detection of a response from the language model, determine that the response comprises program code generated by the language model;
        determine a programming language to which the program code corresponds;
        analyze the program code for vulnerabilities, wherein analysis of the program code for vulnerabilities is based on the programming language of the program code; and
        based on a determination that the program code generated by the language model comprises a vulnerability, indicate that the program code comprises the vulnerability.

16. The apparatus of claim 15, wherein the instructions executable by the processor to cause the apparatus to analyze the program code for vulnerabilities comprise instructions executable by the processor to cause the apparatus to run a machine learning model that has been trained to detect vulnerabilities in program code, wherein the instructions executable by the processor to cause the apparatus to determine that the program code comprises a vulnerability comprise instructions executable by the processor to cause the apparatus to determine that an output of the machine learning model indicates that the program code is vulnerable.

17. The apparatus of claim 15, wherein the instructions executable by the processor to cause the apparatus to analyze the program code for vulnerabilities comprise instructions executable by the processor to cause the apparatus to analyze the program code based on one or more regular expressions, wherein the instructions executable by the processor to cause the apparatus to determine that the program code comprises a vulnerability comprise wherein the instructions executable by the processor to cause the apparatus to determine that the program code matches to a first of the one or more regular expressions.

18. The apparatus of claim 15, wherein the instructions executable by the processor to cause the apparatus to analyze the program code for vulnerabilities comprise instructions executable by the processor to cause the apparatus to generate an abstract syntax tree (AST) from the program code and analyze the AST based on one or more rules, wherein the instructions executable by the processor to cause the apparatus to determine that the program code generated by the language model comprises a vulnerability comprise the instructions executable by the processor to cause the apparatus to determine that the AST generated from the program code satisfies a first of the one or more rules.

19. The apparatus of claim 15, wherein the instructions executable by the processor to cause the apparatus to determine the programming language to which the program code corresponds comprise instructions executable by the processor to cause the apparatus to match the program code to a first pattern of a plurality of patterns, wherein the first pattern corresponds to the programming language.

20. The apparatus of claim 15, further comprising instructions executable by the processor to cause the apparatus to extract the program code from the response based on identification of one or more strings or one or more tags indicative of program code.

\* \* \* \* \*